United States Patent [19]

Hüller et al.

[11] 4,307,568
[45] Dec. 29, 1981

[54] GAS TURBINE POWER PLANT HAVING A HEAT EXCHANGER

[75] Inventors: Josef Hüller, Munich; Wolfram Krockow, Düsseldorf, both of Fed. Rep. of Germany

[73] Assignee: MTU Motoren-und Turbinen-Union Munchen GmbH, Munich, Fed. Rep. of Germany

[21] Appl. No.: 127,173

[22] Filed: Mar. 5, 1980

[30] Foreign Application Priority Data

Mar. 9, 1979 [DE] Fed. Rep. of Germany ....... 2909394

[51] Int. Cl.³ .......................... F02C 7/10; F02C 7/105
[52] U.S. Cl. ........................ 60/39.51 R; 60/39.51 H
[58] Field of Search ................... 60/39.51 R, 39.51 H; 165/8

[56] References Cited

U.S. PATENT DOCUMENTS 2,925,714  2/1960  Cook .......................... 60/39.51 R
3,705,492 12/1972  Vickers ....................... 60/39.51 R
3,742,702  7/1973  Quinn ......................... 60/39.51 R

FOREIGN PATENT DOCUMENTS

597853  2/1948  United Kingdom ........... 60/39.51 R

Primary Examiner—Louis J. Casaregola
Attorney, Agent, or Firm—Alan H. Levine

[57] ABSTRACT

A gas turbine power plant, such as a gas turbine engine for a motor vehicle, having a gas turbine, a combustor for producing hot gas to drive the turbine, and an air compressor for furnishing compressed air to the combustor. A heat exchanger, such as a rotary regenerator or a cross-flow recuperator, is located between the air compressor and the combustor for heating air by exhaust gas from the turbine before the air enters the combustor. The air leaving the exit of the heat exchanger decreases in temperature in a direction from one end of the exit to the other. A plurality of separate ducts conduct air from successive areas along the length of the heat exchanger exit to corresponding successive regions along the length of the combustor, the air temperature being lower in each succeeding duct. The lowest temperature air is conducted to the region containing a forward portion, e.g., the head, of the combustor, and air of progressively higher temperature being ducted to successive regions closer to the exhaust end of the combustor.

7 Claims, 10 Drawing Figures

GAS TURBINE POWER PLANT HAVING A HEAT EXCHANGER

The invention relates to a gas turbine power plant, such as a gas turbine engine used to propel a motor vehicle, and more particularly such a power plant incorporating a heat exchanger.

Gas turbine power plants of this type are generally known. In the heat exchanger, the heat contained in the turbine exhaust gas is partly transferred to the compressor outlet air prior to its entry into the combustor. This results in an improved specific fuel consumption of the gas turbine power plant. Specific fuel consumptions similar to those of compression-ignition engines, or even lower, can be achieved, which is why gas turbine power plants for propelling motor vehicles are usually fitted with such heat exchangers.

The relatively high combustion entry temperature, resulting from use of a heat exchanger, makes the cooling capacity of this air inadequate for protecting the combustor walls, which mainly consist of sheet metal, against deleterious effects of hot gases, and to achieve economic, i.e., sufficiently extended, useful lives of these walls.

A further problem presents itself in the increasing tightening of exhaust emission regulations and in the marked limitation of the permitted pollutant emission quantities, as the emission of nitrogen oxides increases greatly with the use of pre-heated air as a result of their exponential dependance on temperature.

An arrangement is known for diverting one part of the air exiting the compressor, at a location in front of the heat exchanger, and of supplying the diverted part to the forward region of the combustor, and of heating the other part of the air in the heat exchanger and supplying that part to the combustor at a more rearward location (see U.S. Pat. No. 3,705,492). In this way, the generation of nitrogen oxides is reduced due to the lower peak temperatures in the combustion zone.

Similarly, arrangements are known for reducing the generation of nitrogen oxides and carbon monoxide (CO) and the emission of unburnt hydrocarbons (HC) (see U.S. Pat. Nos. 3,826,078; 3,986,347; and 4,012,902). In all these cased there is a resulting reduced thermal efficiency or power loss in the gas turbine power plant, or gas turbine engine, due to the diversion of air for the combustion chamber at a location in front of the heat exchanger.

In the case of a rotary regenerator, the above-mentioned decrease in air temperature (irregular air temperature distribution, nonhomogeneous air temperature field) across the air exit results from the comparatively slow rotation of its rotor, or matrix. The maximum heating of the air is encountered where the heated matrix enters the air side. On its way through the air side, the matrix gives off heat to the air, so that the air temperature across the air exit decreases in the sense of rotation of the matrix. The difference between the maximum and minimum air exit temperature depends on the design of the heat exchanger, this difference being greater for a rotary generator rotating slowly than for one rotating at a higher speed. In the case of the cross-flow recuperator, the air is heated maximally along the exhaust gas entry side and is heated minimally along the exhaust gas exit side, as it gives off heat on its way to the exit side. As a result of this, the air temperature decreases along the air exit in the direction of exhaust gas flow.

It is the object of this invention to provide protection for the combustor head against the influence of excessive heat, and to achieve a reduction in the generation of nitrogen oxides ($NO_x$) or, actually, to achieve combustion with reduced emission of pollutants while suffering no or little reduction in performance of the gas turbine power plant, or the gas turbine engine, particularly as compared to the prior art engine mentioned above.

This objective is achieved by applying lower temperature air from the heat exchanger to the forward portion of the combustor, and applying air of progressively higher temperature from the heat exchanger to regions closer and closer to the exhaust end of the combustor.

This invention enables the air with the lower temperatures emanating from the heat exchanger air exit, or from the subdivision or differentiated subdivision of the nonhomogeneous air exit temperature field, to be applied, on the one hand, in the cooling of the combustor head and, on the other hand, in reducing the generation of $NO_x$. The higher temperatures in the rearward combustor zones can be employed for reducing the emission of carbon monoxide and unburnt hydrocarbons. The diversion of air at a location in front of the heat exchanger may be reduced in amount or deleted, so that less or no performance loss will result.

The combustor of the gas turbine power plant according to this invention is generally of the single-tube type, the annular-type (annulus with tubular cross-section), or the tuboannular type (cans distributed over 360°) the medium flowing axially or annular-axially through the combustor in all cases.

Advantageous aspects of the invention, and of the gas turbine power plant of this invention, will become apparent from the following description in which reference is made to the accompanying drawings. The design, or overall design, is comparatively simple in construction, ingenious, practical, and compact.

The drawings show temperature distributions for heat exchangers, as well as embodiments of the invention.

Figure 1:
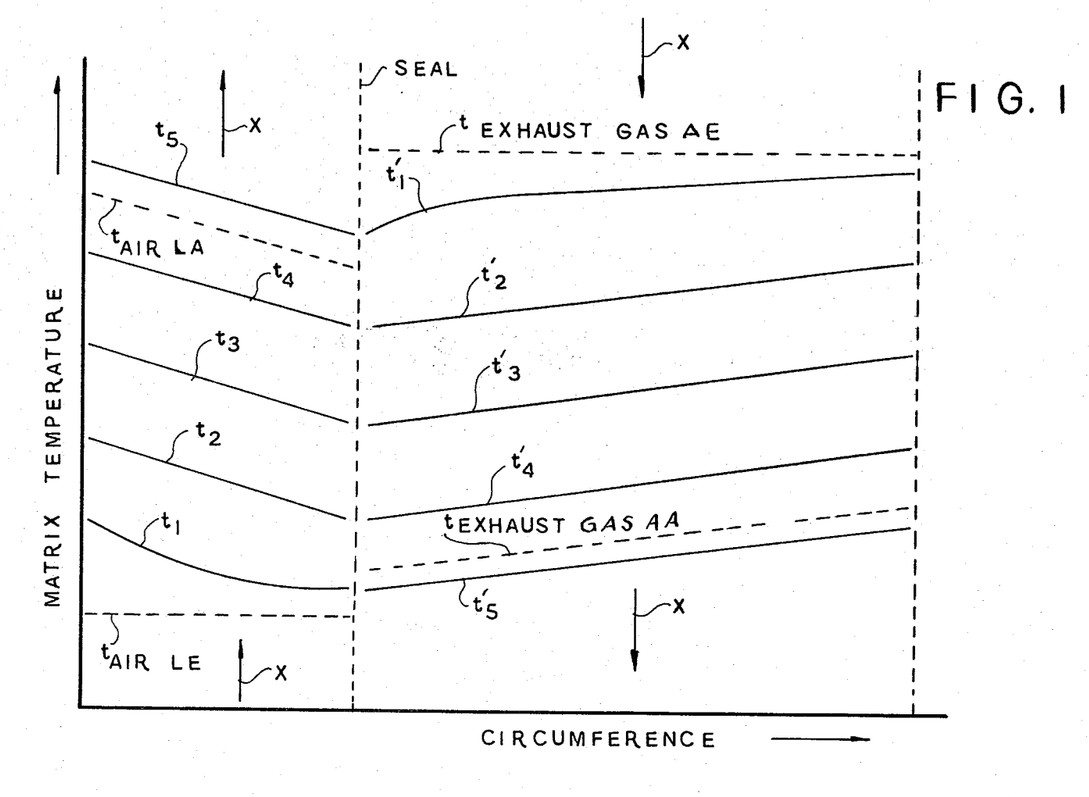
FIG. 1 is a diagram, for a regenerative heat exchanger, namely a rotary regenerator with disc-shaped matrix, in which the matrix temperatures and the entry and exit temperatures of the exhaust gas and the air are plotted against circumference.

The arrows x in FIG. 1 indicate that the exhaust gas and the air flow through the matrix of a rotary regenerator in opposite directions. The diagram shows that the matrix temperatures $t'_1$ to $t'_5$ increase continuously from a minimum to a maximum value across the exhaust gas side in the circumferential direction, or direction of rotation, and that the matrix temperatures $t_1$ to $t_5$ decrease continuously across the air side from this maximum value to this minimum value. A similar pattern is experienced by the exhaust gas and air temperatures in the matrix, which are not included in the diagram, and by the exhaust gas temperature across the exhaust gas exit $t_{Exhaust\ Gas\ AA'}$ and, relevant to the invention, by the air temperature across the air exit $t_{Air\ LA}$. The exhaust gas temperature across the exhaust gas entry $t_{Exhaust\ Gas\ AE}$ is constant, as well as the air temperature across the air entry $t_{Air\ LE}$.

Figure 2:
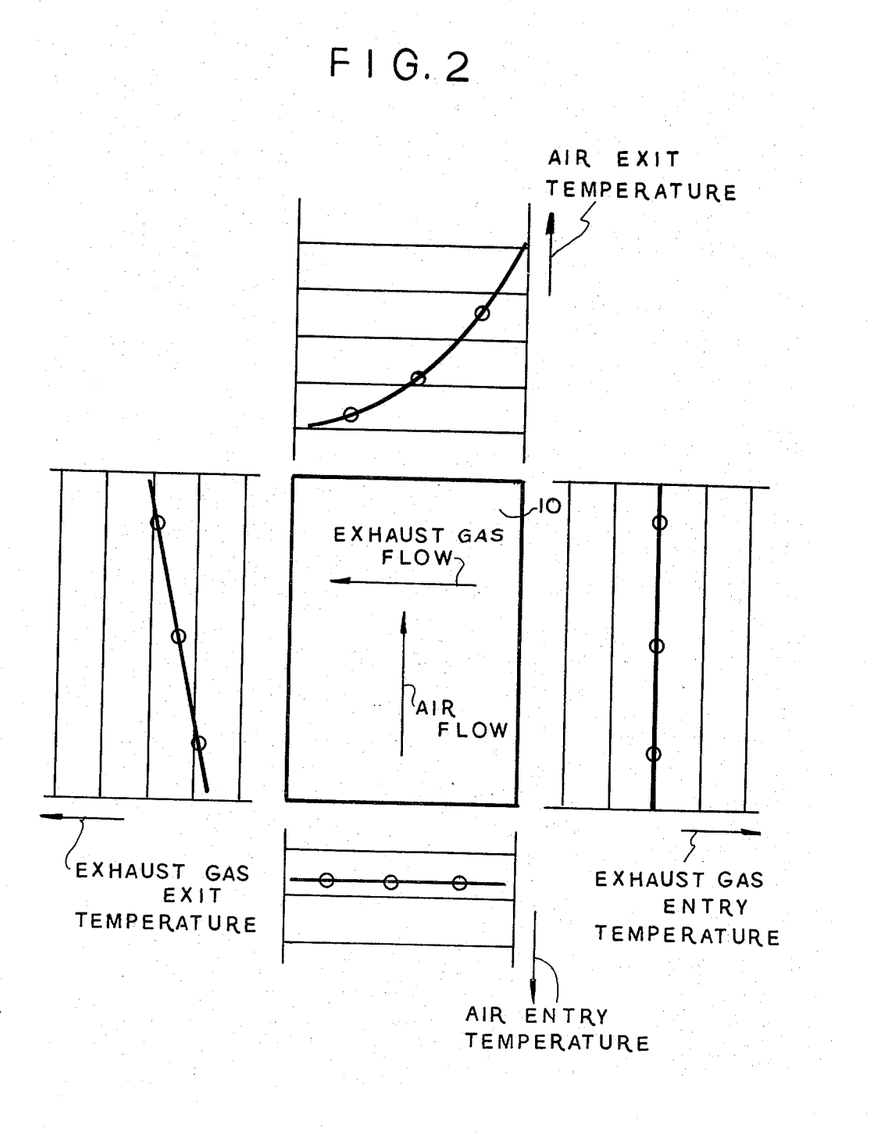
FIG. 2 are diagrams for a cross-flow recuperator, with plots of the entry and exit temperatures of the exhaust gas and the air along the entries and exits in the direction of the exhaust gas and air flow, respectively.

In FIG. 2, the arrows indicate the crossflow in a recuperator 10. The exhaust gas flow and the air flow fully occupy the corresponding width of the recuperator 10. The diagrams show a constant exhaust gas entry temperature, a changing exhaust gas exit temperature, a constant air entry temperature and, relevant to the invention, a decreasing air exit temperature along the air exit in the direction of the exhaust gas flow.

Figure 3:
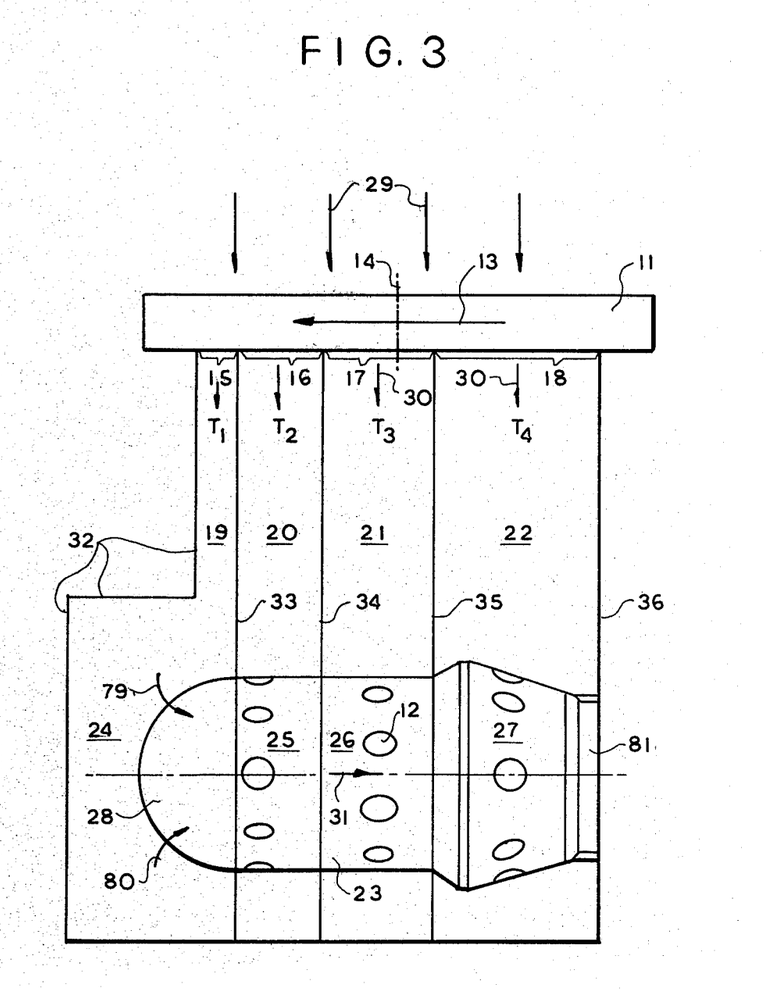
FIG. 3 illustrates the invention employing a rotary regenerator.

In the arrangement of FIG. 3, air flowing in the direction of arrows 29 enters the rotary regenerator, or its disc-shaped matrix, 11 rotating as indicated by arrow 13, flows around an axis 14, and exits from the matrix 11, in a heated state, in the direction of arrows 30. The air exit is subdivided into areas 15 to 18, following one after the other in the circumferential direction, and the mean air exit temperatures $T_1$ to $T_4$ decrease in the direction of arrow 13, i.e., in the relation $T_1-T_2<T_3<T_4$. Separate air ducts 19 to 22 lead from the areas 15 to 18 to the areas 24 to 27 of a tubular combustor (single-tube combustor) 23. The corresponding air streams enter these areas 24 to 27 at approximately the temperatures $T_1$ to $T_4$. The cross-sectional shape of the combustor 23 is circular along its entire length. The areas 24 to 27 are arranged axially along the tube, one after the other, in the direction indicated by arrow 31. The air duct 19 containing the coldest air ($T_1$) leads to the area 24, or to the combustor head 28, the air duct 20 ($T_2$) leads to the next-following area 25, the air duct 21 ($T_3$) to the area 26, and the air duct 22 with the hottest air ($T_4$) to the area 27. The areas 25 to 27 of the combustion chamber wall are each formed with a row of air holes 12, extending over 360°, through which the air from the air ducts 20 to 22 enters the interior of the combustor 23. The combustor head 28 also has air holes, which are not shown. The inlet air flow at this location is indicated by arrows 79 and 80.

The sizes of the air exit areas 15 to 18 increase from area to area in the direction of increase of the air exit temperature from $T_1$ to $T_4$. The same applies to the tube-axial width of the areas 25 to 27 in the direction of arrow 31. The tube-axial width of the area 24 is, however, greater than that of the area 25, due to the fact, among others, that the combustor head 28 projects outwardly in the tube-axial direction. Moreover, the sum of the cross-sectional areas of the air holes 12 in each of the areas 25 to 27 increases in the direction of arrow 31, although this is not illustrated in FIG. 3.

The air ducts 19 to 22 are formed by exterior walls 32 and 36 and by partitions 33 to 35. Each two adjacent air ducts are separated by a single partition, e.g., the air ducts 20 and 21 are separated by partition 34. The areas 24 to 27 extend in width from one partition to the next.

Thus, FIG. 3 illustrates a differentiated subdivision of the nonhomogeneous air temperature field in the heat exchanger air exit, with airflows of different temperatures ducted by partitions from the air exit to specific areas of the combustor.

Among other purposes, the air serves in the interior of the combustor for the differentiated reduction of the pollutant emission. More specifically, the air in areas 24 and 25, which both represent or include the combustion chamber primary zone, serves to reduce $NO_x$, and the air in areas 26 and 27 serve to reduce the emission of CO and of unburnt hydrocarbons. Furthermore, the air arriving in area 24 serves to cool the combustor head 28. The combustor head is also supplied with fuel. The hot gas exit of the combustion chamber 23 is indicated at 81.

Figure 4:
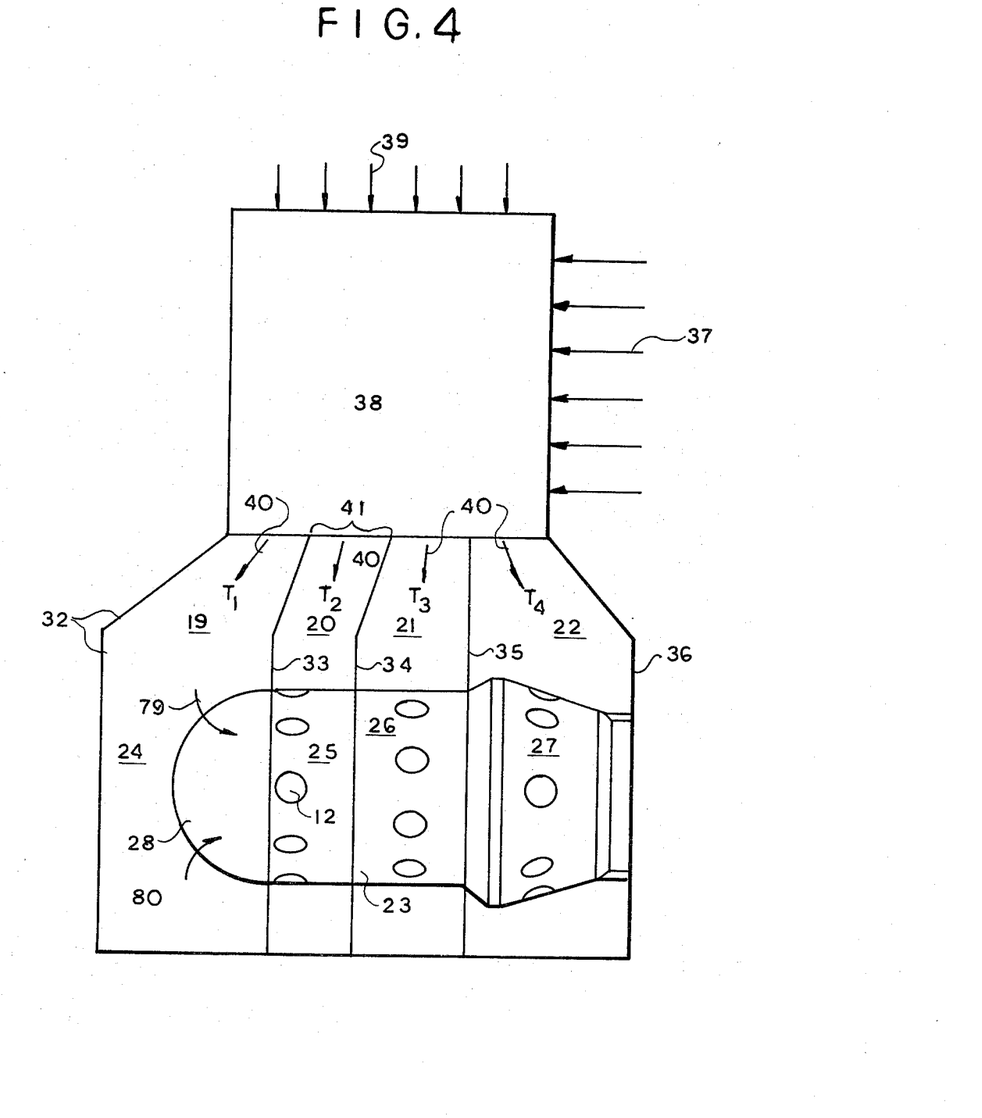
FIG. 4 illustrates the invention employing a cross-flow recuperator.
Figure 5:
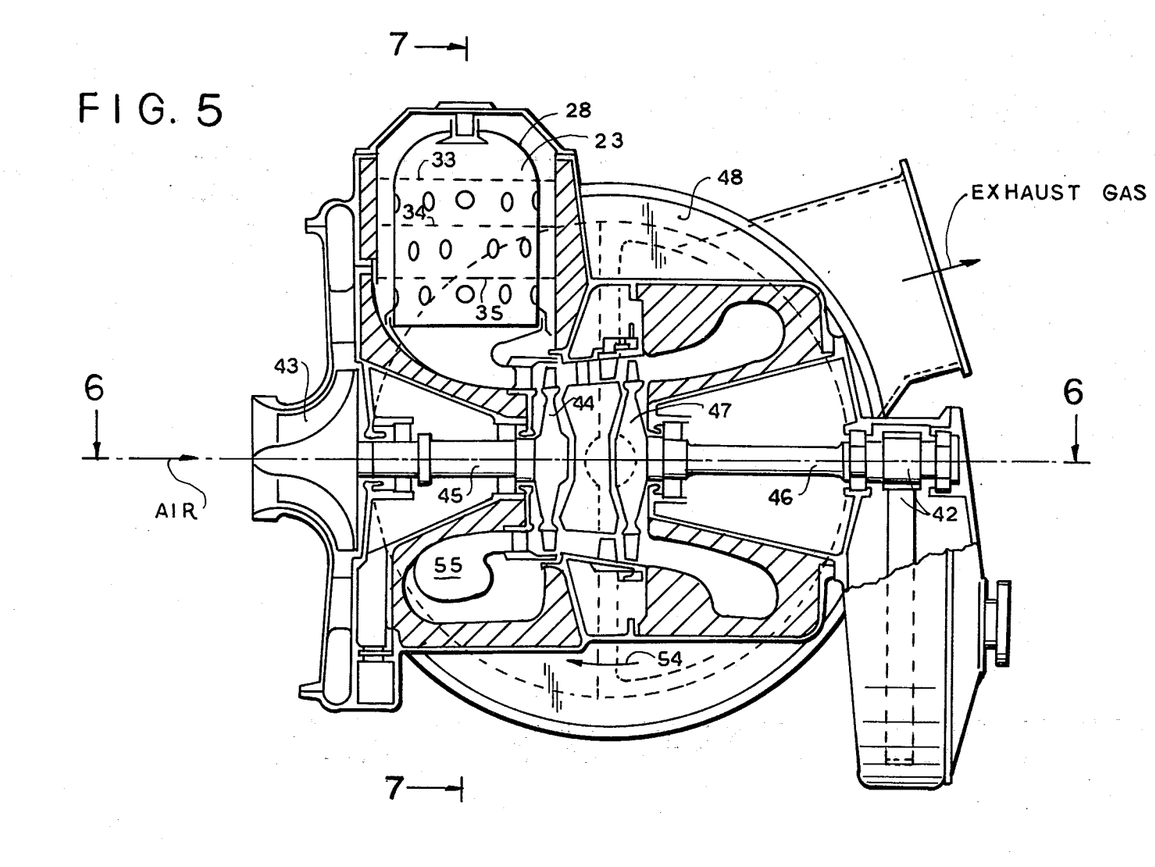
FIG. 5 is a longitudinal cross-sectional view of a gas turbine engine, according to the invention, having two rotary regenerators.

In FIG. 4, arrows 37 indicate the exhaust gas flow and arrows 39 indicate the air flow through a cross-flow recuperator 38, from which heated air leaves in the direction of arrows 40. The air exit of the recuperator 38 is subdivided into areas 41, following one after the other in the direction of the exhaust gas flow. The mean air exit temperatures $T_1$ to $T_4$ in the direction of exhaust gas flow according to the relation $T_1<T_2<T_3<T_4$. For the combustor 23, the areas 24 to 27, the air ducts 19 to 22, the walls 32 to 36, the air holes 12, and the purposes of flowing air of different temperatures to the areas 24 to 27, the description with respect to FIG. 3 applies.

FIGS. 5 to 8 illustrate a two-shaft engine with a gas producer and single-stage axial-flow power turbine (free turbine). The gas producer comprises a single-stage radial-flow compressor for the air, a single-tube combustor 23, and a single-stage, axial-flow gas producer turbine. The rotor wheel 43 of the radial-flow compressor and the rotor wheel 44 of the gas producer turbine are supported by a common shaft 45. Shaft 45 is in line with a shaft 46 which supports the rotor wheel 47 of the power turbine. The combustion chamber 23 is positioned vertically upright, in a vertical plane containing the shaft 45, at a location above the shaft 45. The combustor head 28 is located above the combustor exit (hot gas exit). The two rotary regenerators 48 and 49 are of the same design, each having a disc-shaped rotor or a disc-shaped matrix. The two axes of these rotors are in line with each other and are located horizontally and perpendicular to the axes of shafts 45 and 46. The two regenerators 48 and 49 are arranged symmetrically with respect to the shafts 45 and 46 on two longitudinal sides of the engine or the gas turbine. The air exits or air exit areas (15 to 18) of the two regenerators 48 and 49 face each other.

Figure 6:
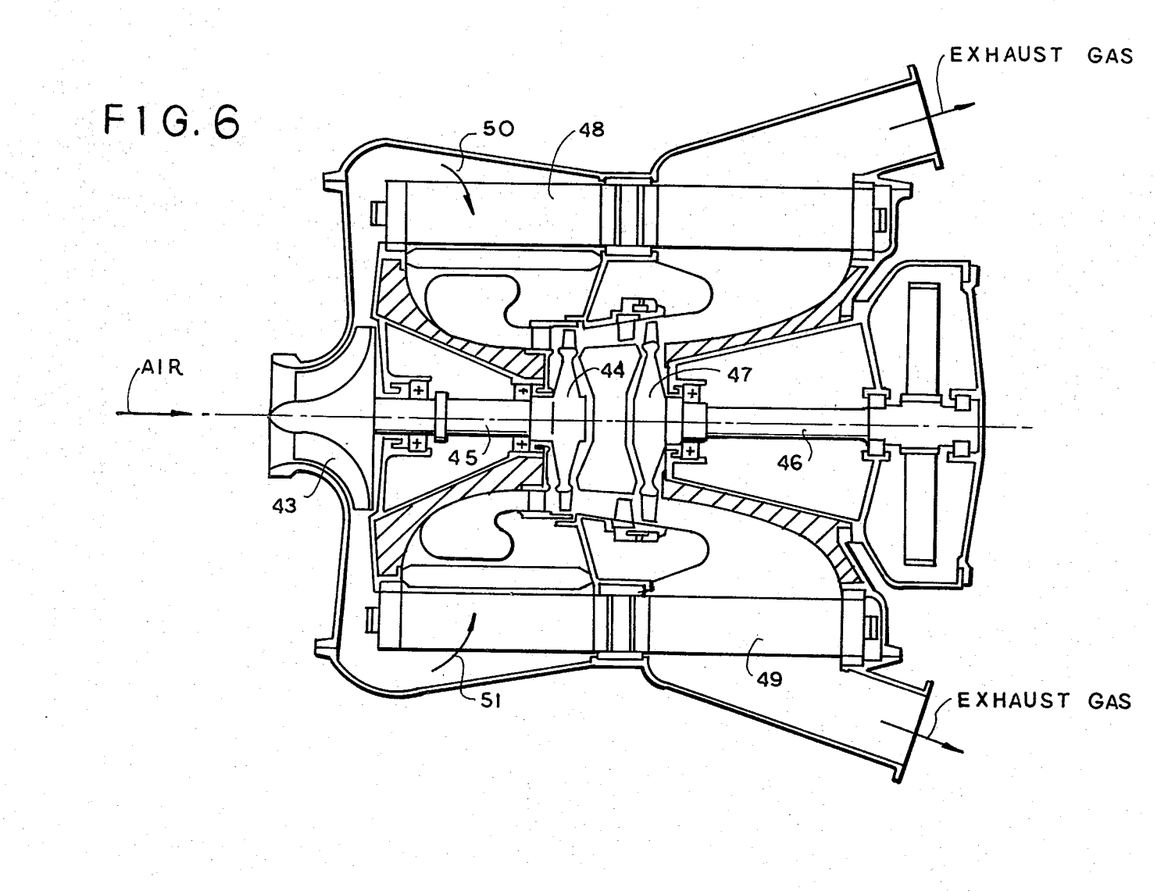
FIG. 6 is a cross-sectional view taken along line 6—6 of FIG. 5.
Figure 7:
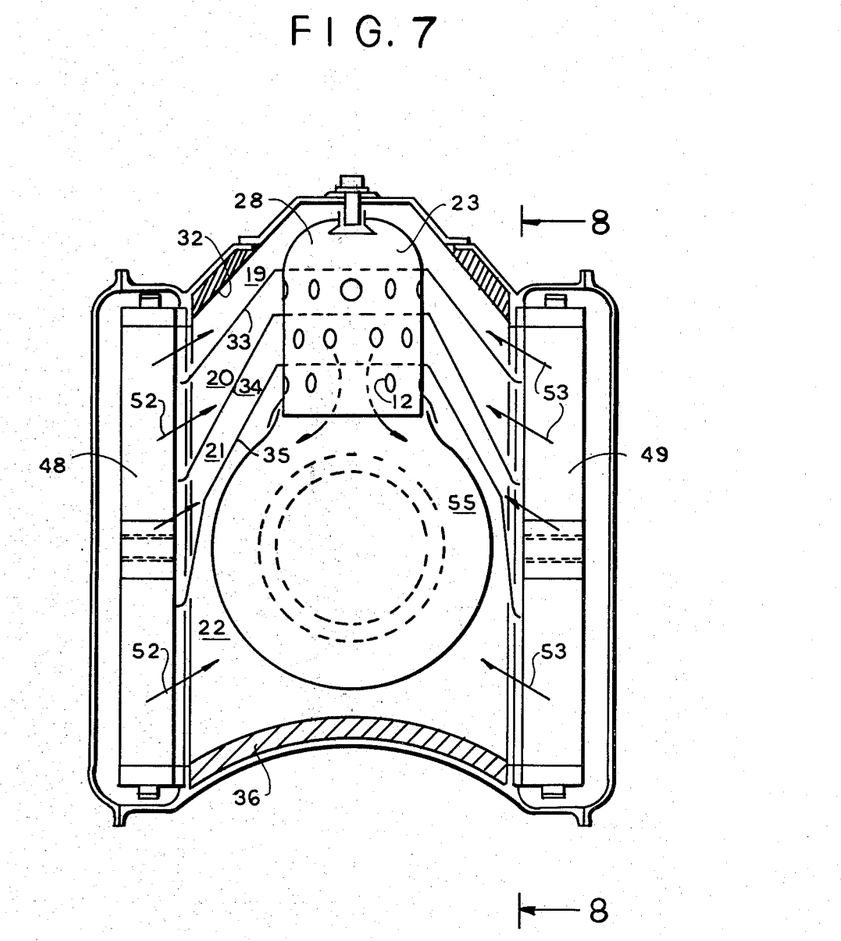
FIG. 7 is a cross-sectional view taken along line 7—7 of FIG. 5.
Figure 8:
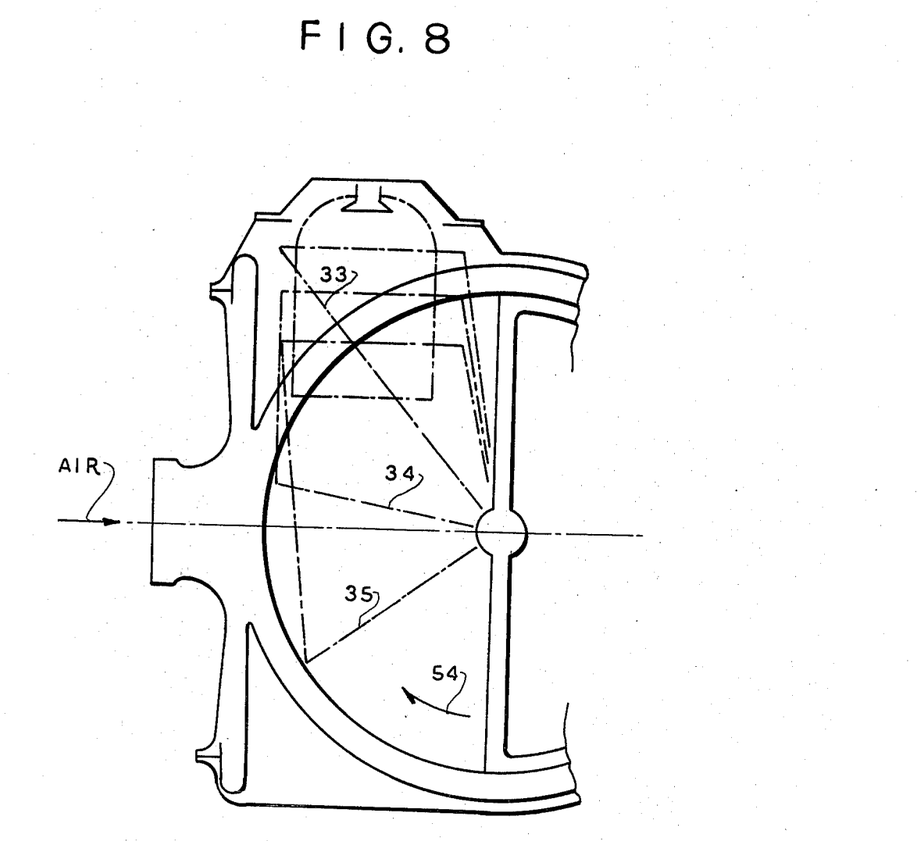
FIG. 8 is a cross-sectional view taken along line 8—8 of FIG. 7.

The radial-flow compressor 43 draws in air (see the arrow "air" in FIGS. 5, 6 and 8) and compresses and delivers the air to the regenerators 48 and 49, as indicated by arrows 50 and 51 in FIG. 6. The air flows through the regenerators approximately axially to the matrix, and is heated by the exhaust gas. The heated air exits toward combustor 23 in four streams via the four air ducts 19 to 22 (see FIG. 7), as indicated by the four arrows 52 and the four arrows 53. For the air exit areas (15 to 18) of each of the two regenerators 48 and 49, the combustor 23, the combustor areas (24 to 27), the air ducts 19 to 22, the walls 32 to 36 (see FIGS. 7 and 8), and the air holes 12, the description with respect to FIG. 3 applies. As a result of the given sense of rotation of the matrix discs (see arrow 54 in FIGS. 5 and 8), and owing to the partitions 33 to 35, the coldest air of the air exit area (15 to 18) is delivered to the combustor head 28, etc., according to the differentiated supply described with respect to FIG. 3.

The air delivered from the air ducts 19 to 22 to the combustor 23 aids in the combustion of fuel with reduced pollutant emission and in cooling of the combustor 23, excess air being used so that the hot gas leaving the combustion chamber is a mixture of combustion gases and excess air. This hot gas has reduced pollution emissions, and flows through a gas diverter 55 (FIGS. 5 and 7) and, acting as a propulsive agent, through the gas producer turbine 44 and then through the power turbine 47. Subsequently, the exhaust gas flows through the regenerators 48 and 49 and leaves the engine via the exhaust ports (see the arrows "exhaust gas" in FIGS. 5 and 6). The output of the power turbine 47 is transmitted from the shaft 46 to a reduction gear 42. The engine may also be designed with a single rotary regenerator incorporating the features according to this invention.

Figure 9:
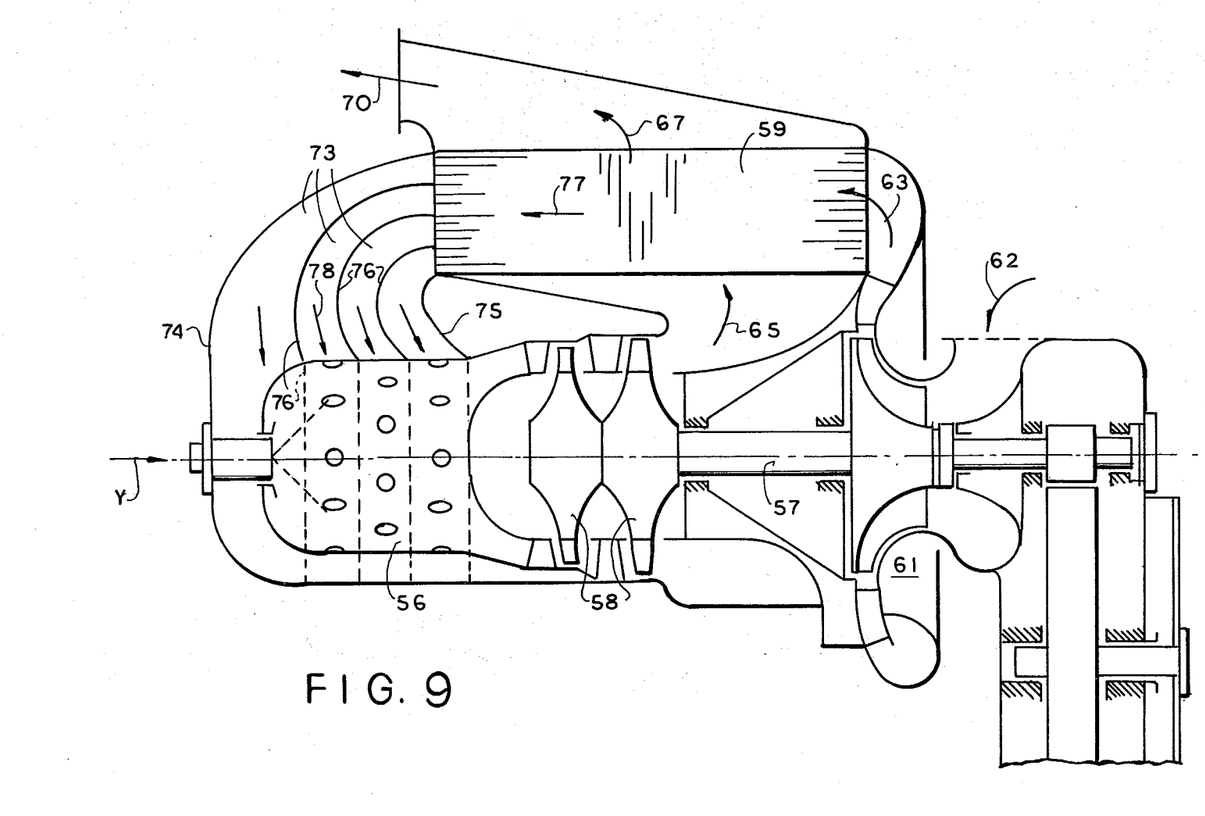
FIG. 9 is a longitudinal cross-sectional view of an alternative gas turbine engine according to the invention, having two cross-flow recuperators.
Figure 10:
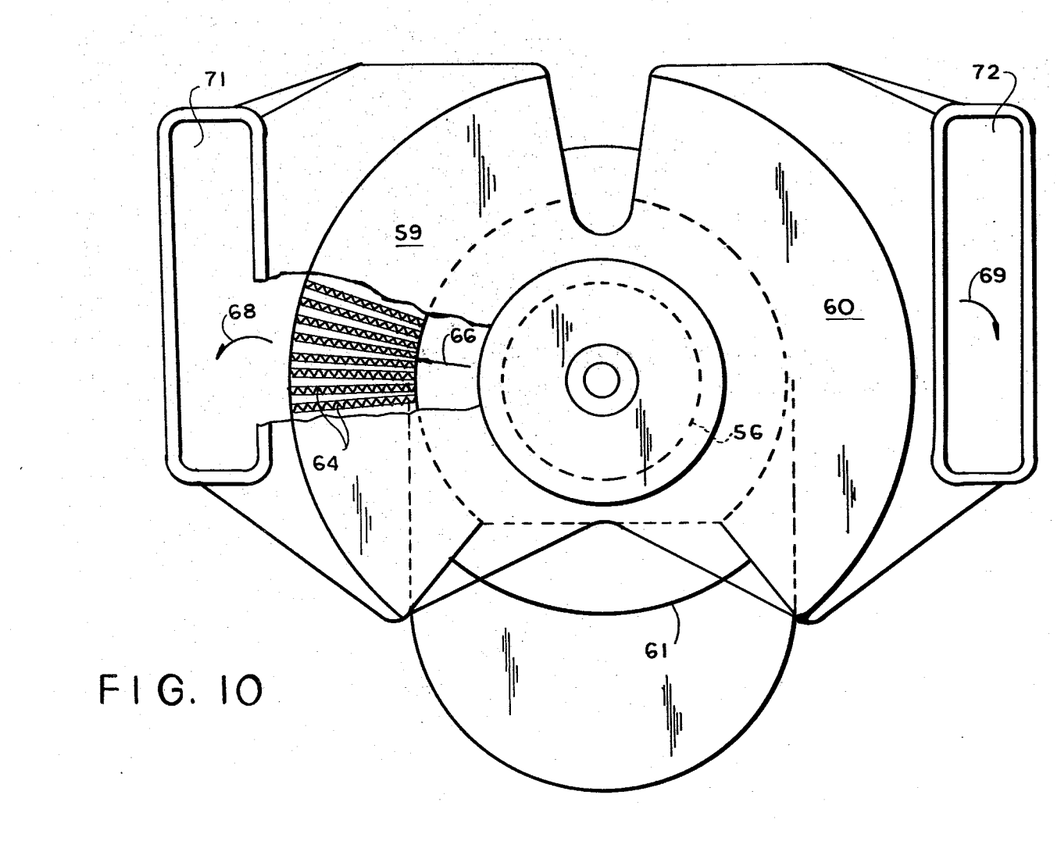
FIG. 10 is an elevational view of the engine of FIG. 9 looking in the axial direction indicated by arrow Y.

The engine illustrated in FIGS. 9 and 10 is of the single-shaft type. Its single-tube combustor 56 is arranged in line with the shaft 57 and upstream of the two stage axial-flow turbine 58. The two cross-flow recuperators 59 and 60 are of the same design and are located along two longitudinal sides of the engine, or the axial gas turbine, and symmetrical with the shaft 57. As viewed in a cross-section perpendicular to the shaft, and in FIG. 10, each of the recuperators 59 and 60 is in the shape of a circular segment having its center of curvature on the axis of the shaft 57. The air supplied by the radial-flow compressor 61 flows through the recuperators in a longitudinal direction and opposite to the axial direction of gas flow through the axial-flow turbine 58. The exhaust gas flows through the recuperators radially outwardly, i.e., from the inside to the outside. The flow path of the air is indicated by the arrows 62, 63 and 77. In the recuperators 59 and 60, the air flows through the longitudinal ducts 64. The flow path of the exhaust gas is indicated by the arrows 65, 67, and 70.

The exhaust gas leaves the engine via two exhaust ducts 71 and 72 as indicated by arrows 68 and 69 in FIG. 10. The exhaust gas flow in the recuperators 59 and 60 results in the fact that the heating of the air decreases radially from the inside to outside, so that the air temperature across the air exit at this location decreases in the direction of this exhaust gas flow. Four air ducts 73 with two outer walls 74 and 75 and three partitions 76 are provided. The arrows 78 indicate the entry of the four corresponding air streams to the four combustor areas or zones. As in FIGS. 5 to 8, the ends of the air ducts 73 at the combustor are separated by three partitions 76. In FIGS. 9 and 10, the coolest air flow impinges upon the combustor head. Combustion with reduced emission of pollutants, as described above, also takes place in the combustor 56 as a result of this differentiated air supply. The power output is as described with reference to FIGS. 5 to 8.

The invention has been shown and described in preferred form only, and by way of example, and many variations may be made in the invention which will still be comprised within its spirit. It is understood, therefore, that the invention is not limited to any specific form or embodiment excep insofar as such limitations are included in the apended claims.

What is claimed is:

1. In a gas turbine power plant having:
   (a) a gas turbine,
   (b) a combustor for producing hot gas to drive the turbine,
   (c) an air compressor for furnishing compressed air to the combustor, and
   (d) a heat exchanger, between the air compressor and the combustor, wherein air is heated by exhaust gas from the turbine before the air enters the combustor, the heat exchange between the exhaust gas and air being such that the air leaving the exit of the heat exchanger decreases in temperature in a direction from one end of the exit to the other,
   the improvement comprising:
   (e) means for separately ducting air from successive areas along the length of the heat exchanger exit to corresponding successive regions along the length of the combustor, the air temperature being lower in each succeeding duct means in said direction from one end of the heat exchange exit to the other, the lowest temperature air being ducted to the region containing a forward portion of the combustor, and air to progressively higher temperature being ducted to successive regions closer to the exhaust end of the combustor.

2. In a gas turbine power plant, the arrangement of claim 1 wherein the heat exchanger is a rotary regenerator.

3. In a gas turbine power plant, the arrangement of claim 1 wherein the heat exchanger is a cross-flow recuperator.

4. In a gas turbine power plant, the arrangement of claim 1 wherein said ducting means comprises four ducts leading from four different areas along the length of the heat exchanger exit to four corresponding regions along the length of the combustor, the lowest temperature air being ducted to the region containing the combustor head.

5. In a gas turbine power plant, the arrangement of claim 1 including a single partition separating each two adjacent air ducting means.

6. In a gas turbine power plant, the arrangement of claim 1 including two heat exchangers, each heat exchanger being a rotary regenerator, the rotary regenerators being on opposite sides of the gas turbine, and wherein the combustor is arranged transverse to the longitudinal axis of the gas turbine in a plane containing the gas turbine axis, the combustor being between the two rotary regenerators.

7. In a gas turbine power plant, the arrangement of claim 1 including two heat exchangers, each heat exchanger being a cross-flow recuperator, the cross-flow recuperators being on opposite sides of the gas turbine, means for causing exhaust gas from the turbine to flow radially outwardly through each recuperator, and means for causing air to flow longitudinally through each recuperator in a direction opposite to the direction in which hot gas enters the gas turbine.

* * * * *